United States Patent [19]
Calmettes

[11] Patent Number: 5,946,775
[45] Date of Patent: Sep. 7, 1999

[54] GRIPPING COLLAR

[76] Inventor: Lionel Calmettes, 4, Rue des Palombes, 11430 Gruissan, France

[21] Appl. No.: 09/010,127

[22] Filed: Jan. 21, 1998

[30] Foreign Application Priority Data

Jan. 21, 1997 [FR] France .................................. 97 00571

[51] Int. Cl.[6] ...................................................... F16L 33/02
[52] U.S. Cl. ......................................... 24/20 TT; 24/23 R
[58] Field of Search ................................ 24/20 R, 20 TT, 24/20 EE, 21, 22, 23 R, 23 EE, 25

[56] References Cited

U.S. PATENT DOCUMENTS

| | | | |
|---|---|---|---|
| 4,237,584 | 12/1980 | Oetiker | 24/20 CW |
| 4,308,648 | 1/1982 | Fay | 24/20 R X |
| 4,312,101 | 1/1982 | Oetiker | 24/20 R |
| 4,907,319 | 3/1990 | Calmettes et al. | 24/20 R |
| 4,924,558 | 5/1990 | Calmettes et al. | 24/20 R X |
| 4,987,652 | 1/1991 | Spaulding | 24/20 R |
| 5,111,555 | 5/1992 | Oetiker | 24/20 R |

*Primary Examiner*—James R. Brittain
*Attorney, Agent, or Firm*—Young & Thompson

[57] ABSTRACT

Gripping collar constituted by a guard (2) and a belt (1). The belt (1) is constituted of a strip of steel, and is comprised by a central cylindrical portion and two end portions constituted by undulations and adapted to snap together one with the other upon closure of the collar.

8 Claims, 1 Drawing Sheet

GRIPPING COLLAR

FIELD OF THE INVENTION

The invention relates to a gripping collar and more particularly a collar in two pieces for gripping flexible pipes to rigid tubes.

BACKGROUND OF THE INVENTION

A collar in two pieces, a belt and a guard, permitting symmetrical gripping relative to the plane of axial symmetry of the collar, is disclosed in FR-A-2.717.555.

In this reference, the guard has snap teeth and the belt snap tongues, such that the tongues coact with the teeth to ensure blocking the collar when a gripping tool brings together the two ends of the belt against each other.

This collar has two drawbacks. First, the teeth are provided on the guard fairly far from its plane of axial symmetry to ensure hooking of the tongues of the teeth. Because of this, the length of the belt located between the snap tongues is of the order of two-thirds of a turn and its possibilities for adaptation to the diameter of the tubes are relatively limited. Then, the ends of the belt must be retained below a locking abutment, carried by the guard in its axial plane of symmetry, to avoid their projecting outwardly. However, their stability under the locking abutment is not ensured.

To avoid these drawbacks, the present invention has for its object to provide a gripping collar in two parts that have neither teeth nor snap tongues, and of which the ends of the belt are not in danger of separating from the plane of symmetry of the collar.

SUMMARY OF THE INVENTION

The invention has for its object a gripping collar constituted by a guard and a belt, disposed substantially symmetrically on opposite sides of an axial plane, the belt being disposed substantially symmetrically relative to an axial plane, the belt being constituted by a steel strip and comprising a central cylindrical portion and two end portions constituted by undulations, characterized in that said undulations are adapted to snap into each other to ensure closing of the collar.

According to other characteristics of the invention:

- each end of the central portion of the belt has a substantially radial fold adapted to constitute a pliers grip,
- the height of the pliers grip is substantially equal to five times the thickness of the belt,
- the camber radius of the pliers grip is at least equal to the thickness of the belt,
- two undulations, substantially diametrically opposed, are provided on the belt to constitute reserves of capacity and of elasticity for the belt,
- the undulations serve as an abutment to the guard, when the collar is open, to maintain its position relative to the belt.

BRIEF DESCRIPTION OF THE DRAWINGS

Other characteristics will become apparent from the description which follows, with respect to the accompanying drawings, in which.

DESCRIPTION OF THE PREFERRED EMBODIMENTS

Figure 1:
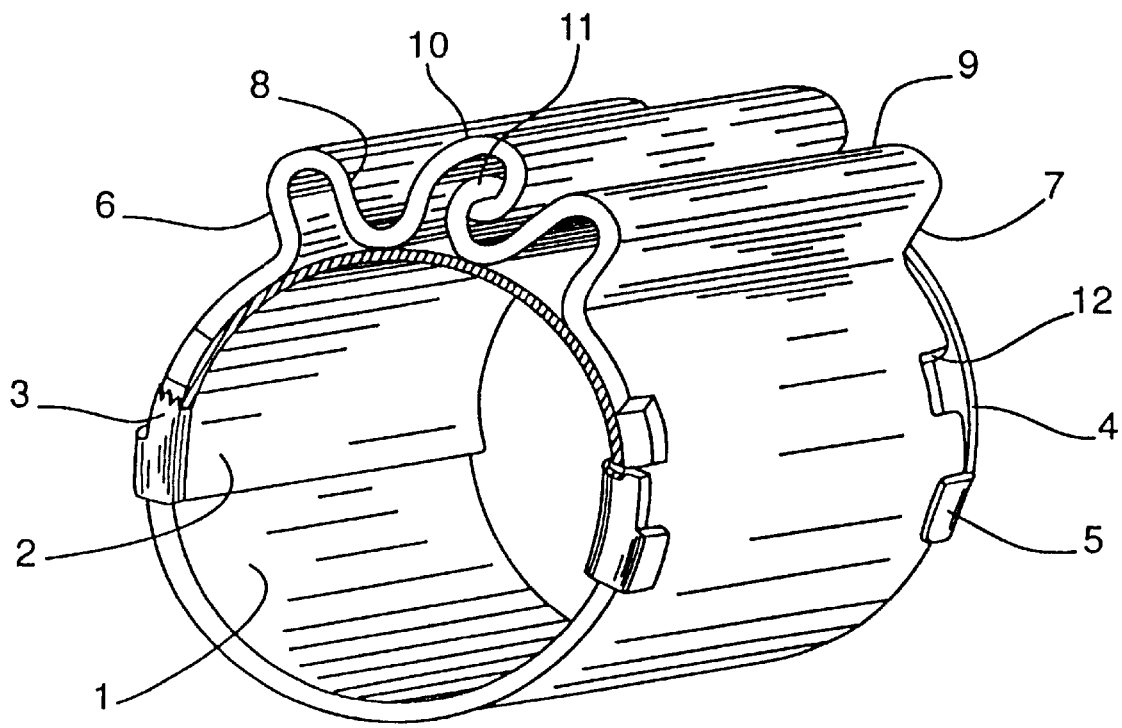
FIG. 1 is a perspective view of a first embodiment of collar according to the invention, in the closed position.

In FIG. 1, the collar is constituted by a belt 1 and a guard 2. The guard 2 is constituted by substantially semi-cylindrical sheet metal, smooth, whose external edges 3, 4 are bent outwardly and carry at their ends retaining fingers such as 5, bent parallel to the cylindrical surface of the guard 2.

The belt 1 is constituted by a steel strip. It is comprised of a central cylindrical portion and end portions constituted by undulations. First of all, at each end of the cylindrical central portion of the belt 1, the strip is directed substantially radially outwardly, then is bent toward the guard 2.

Each end of the central cylindrical portion of the belt 1 thus has a substantially radial bend, constituted by a first surface respectively 6, 7, and a second surface, respectively 8 and 9.

The two end portions of the belt 1 then each have an undulation with a profile in the form of a hook, respectively 10 and 11.

These undulations 10, 11 are fragments of a cylinder and are adapted to snap into each other upon closing the collar.

To permit the assembly of the guard 2 and the belt 1, the belt comprises on its free edges, adjacent the ends of the central portion, recesses such as 12 adapted to let pass the retaining fingers 5 of the guard.

Figure 2:
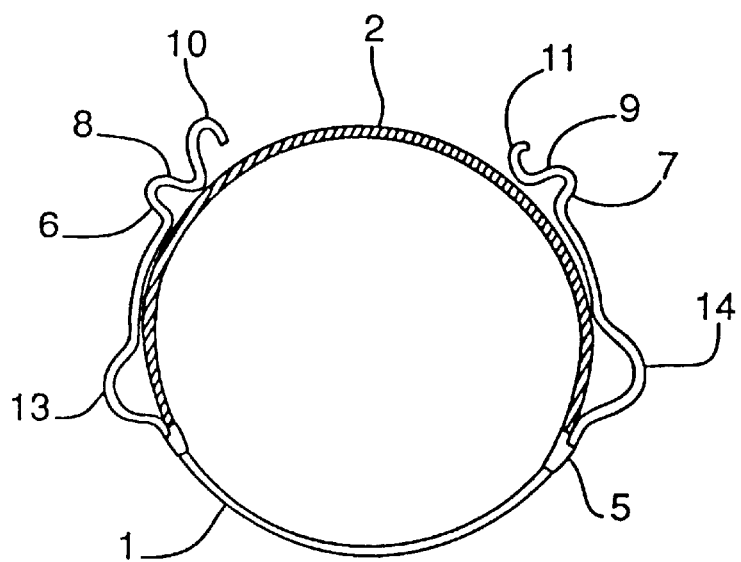
FIG. 2 is an axial view of a second embodiment of the collar according to the invention, in the open position.

In FIG. 2, the collar is shown open, and the same elements are identified by the same reference numerals as in FIG. 1 in which the collar is shown closed. Relative to the collar of FIG. 1, the embodiment of FIG. 2 comprises two undulations 13, 14, substantially diametrically opposed, which constitute reserves of capacity and of elasticity for the collar.

The substantially radial bends, disposed at the ends of the central portion of the belt 1, constitute deformable plier grips to effect the closing of the collar. The height of these plier grips, measured radially from the guard 2, is substantially equal to five times the thickness of the belt 1. The radius of camber of the plier grips is at least equal to the thickness of the belt 1. These dimensions permit making the belt 1 of cold worked ferritic stainless steel, and not of austenitic stainless steel which is more costly by about 66%.

The pliers grips are elastically deformable. They are directly connected to the undulations 10 and 11 which are portions of a cylinder, which gives to each end portion of the belt 1 a deformable assembly with a large elastic path sufficient for a correct operation of the collar.

Thus, when the collar is open (FIG. 2), it is emplaced about a flexible tube which has been slipped over a rigid tube. A pliers is applied simultaneously to the exterior of the surfaces 6 and 7 of the radial bends constituting the pliers grips. When the pliers are closed, the ends of the belt 1 move toward each other until the free edge of the undulation 10 rides over the free edge of the undulation 11 to ensure their mutual snapping together. The pliers is then opened and the belt takes its permanently closed position, the tension of the belt being ensured by the radial bends and the undulations of the ends of the belt 1.

In the modified form of FIG. 2, the undulations 13, 14 have a triple function. First, they serve as an abutment for the retaining fingers 5 of the guard 2, to maintain the relative position, shown in FIG. 2, of the guard 2 and the belt when the collar is open.

Then, they serve as a reserve of capacity at the moment of closing the collar, their resilient deformation making it more easy for the operator who uses the pliers with the least effort. Finally, they serve as an elastic reserve after closure of the collar so as better to permit the belt to regain its stable position and to ensure the distribution of forces.

The collar described with reference to the drawings is constituted by two pieces, the guard 2 and the belt 1, and it is practically symmetrical relative to the axial plane passing through the junction of the two ends of the belt 1.

When the collar is closed, the guard 2 is applied to about half the internal cylindrical surface of the collar. Because of this, the relative extent of the tube gripped by the collar and the belt 1 is reduced to the minimum. Moreover, gripping forces are distributed over the two ends of the belt, which ensures that the midpoint of the belt, located in the plane of symmetry of the collar, is not subjected to any tangential sliding force relative to the tube.

The gripping collar according to the present invention is remarkable in that it effects an economy of material relative to existing collars.

What is claimed is:

1. Gripping collar extending in the direction of a longitudinal axis and comprising a guard and a belt, the belt being comprised by a metal strip having a central cylindrical portion and two end portions constituted by undulations, said undulations (10, 11) being adapted to snap together to ensure closure of the collar, said guard and belt structured and arranged substantially symmetrically relative to an axial plane in which said longitudinal axis lies, wherein the guard has external edges which are bent outwardly and carry at their ends retaining fingers, and the belt comprises on its free edges, adjacent the ends of the central portion, recesses structured and arranged to let the retaining fingers pass.

2. Collar according to claim 1, wherein each end of the central portion of the belt has a substantially radial bend (6, 8; 7, 9) adapted to constitute a pliers grip.

3. Collar according to claim 2, the height of the pliers grip being substantially equal to five times the thickness of the belt (1).

4. Collar according to claim 2, the radius of curvature of the pliers grip being at least equal to the thickness of the belt (1).

5. Collar according to claim 1, wherein two undulating parts (13, 14), substantially diametrically opposed, are provided on the belt (1) to constitute reserves of capacity and of elasticity for the belt.

6. Collar according to claim 5, wherein the undulating parts (13, 14) serve as an abutment for the guard (2), when the collar is open, to maintain the position of the collar relative to the belt (1).

7. Collar according to claim 1, the guard (2) being a part cylinder underlying said undulations.

8. Gripping collar comprising a guard and a belt, the belt being comprised by a metal strip having a central cylindrical portion and two end portions constituted by undulations, said undulations being adapted to snap together to ensure closure of the collar, said belt further comprising two substantially diametrically opposed undulating parts, which constitute reserves of capacity and of elasticity for the belt, said undulating parts serving as an abutment for the guard, when the collar is open, to maintain the position of the collar relative to the belt.

\* \* \* \* \*